Feb. 28, 1967
N. G. KLING
3,307,041
PHOTOELECTRIC DEVICE FOR CYCLICALLY GENERATING CONTROL
SIGNALS IN WHICH THE CYCLE MAY BE SHIFTED
Filed Jan. 7, 1964
2 Sheets-Sheet 1
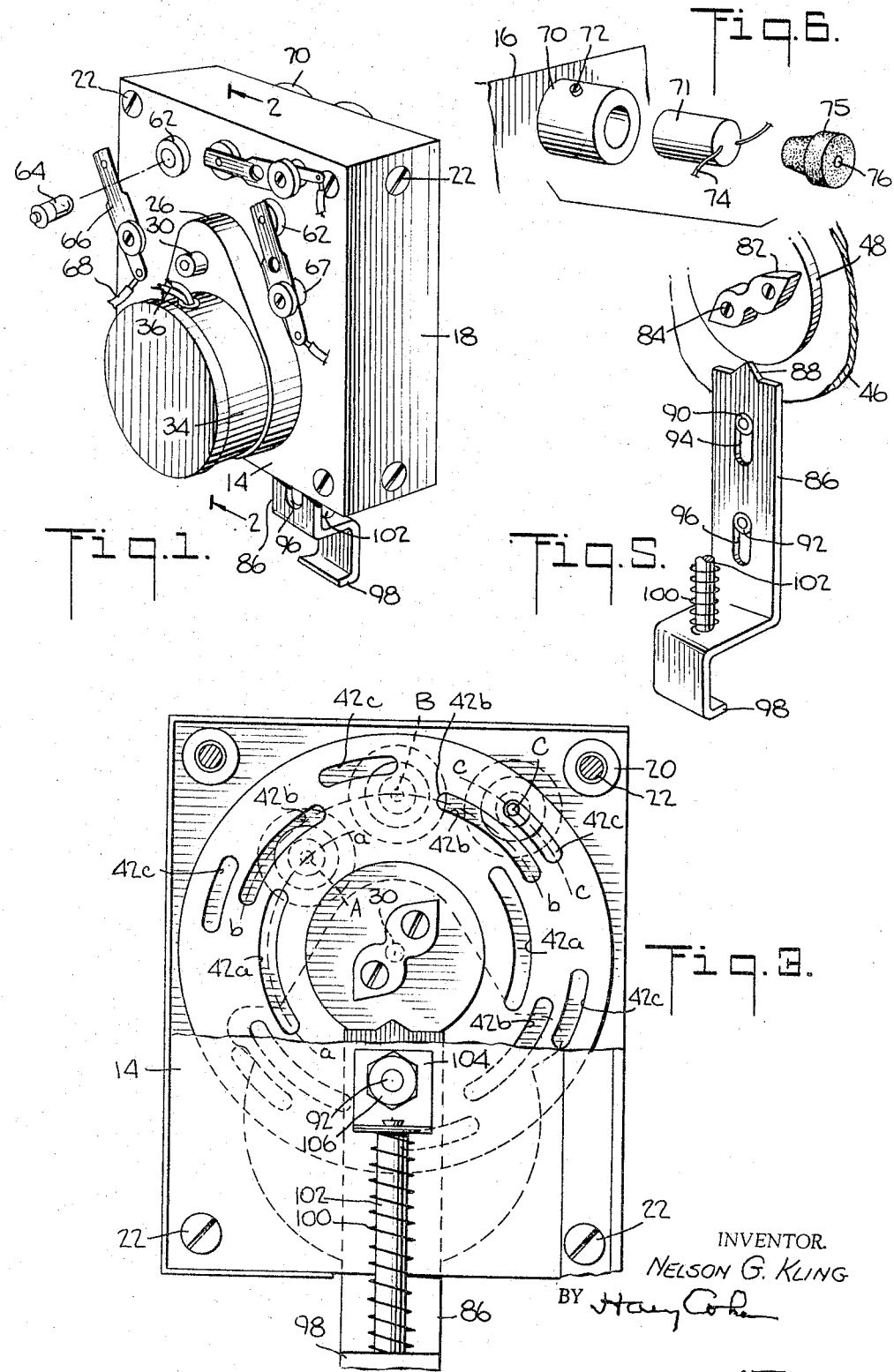
INVENTOR.
NELSON G. KLING
BY Harry Cohen
ATTORNEY

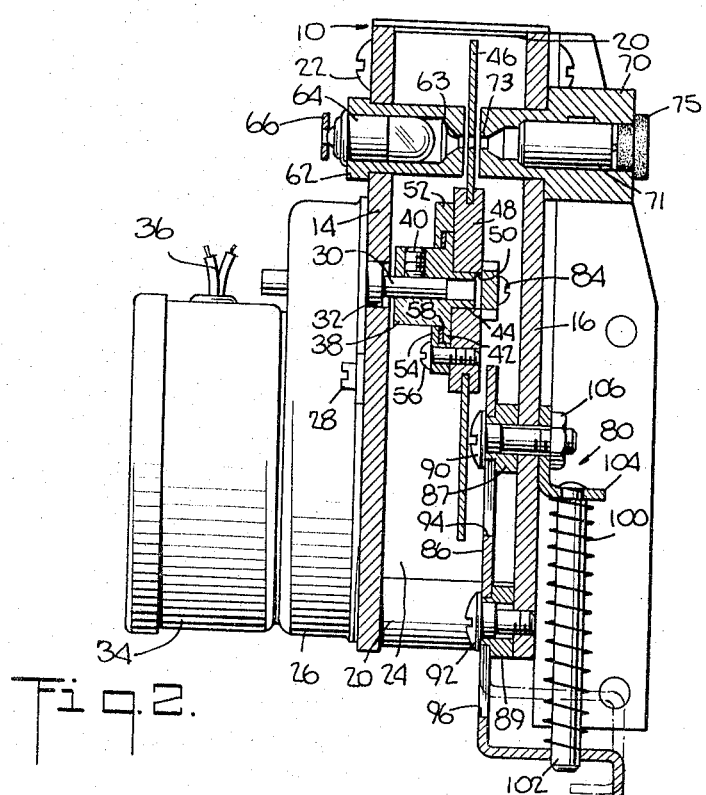
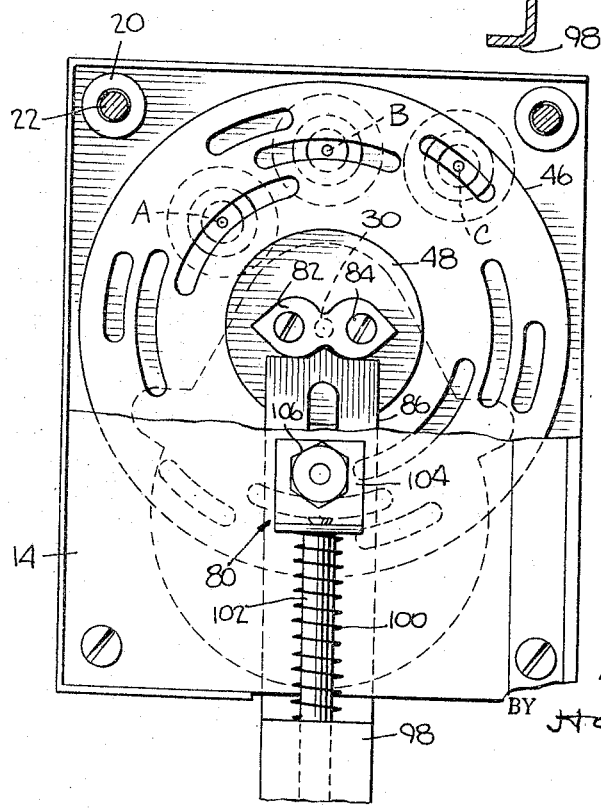

United States Patent Office 3,307,041
Patented Feb. 28, 1967

3,307,041
PHOTOELECTRIC DEVICE FOR CYCLICALLY GENERATING CONTROL SIGNALS IN WHICH THE CYCLE MAY BE SHIFTED
Nelson G. Kling, Ringwood, N.J., assignor to Technicon Instruments Corporation, Chauncey, N.Y., a corporation of New York
Filed Jan. 7, 1964, Ser. No. 336,291
8 Claims. (Cl. 250—236)

This invention relates to improved automatic control devices.

An object of the invention is the provision of automatic control devices which are particularly, though not exclusively, adapted to the simultaneous provision of a plurality of control signals.

In automatic analysis apparatus wherein a plurality of samples are transmitted and quantitatively analyzed for a constituent as a flowing stream of successive samples it is customary to provide a digital print out of the concentration of the constituent in each successive sample. Such an arrangement, for example, is shown in U.S. Patent No. 2,960,910, issued on November 22, 1960, to Milton H. Pelavin. While the device therein shown has a system for automatically determining when print out is to be made, it may also be operated in a synchronous mode. Although the samples are transmitted into the analytical system at known intervals of time, the interval required for a sample to reach the analytical portion of the system, such as the colorimeter, may not be precisely known. Therefore, it is desirable to have means to synchronize the cycle of the print out with the cycle of the sample passage through the colorimeter.

It is, therefore, a primary object of this invention to provide a device for cyclically generating a predetermined sequence of control signals, wherein the phase of the cycle may be rapidly and easily shifted.

A feature of this invention is a device for cyclically providing a predetermined series of control signals comprising: cyclically operable motive means; cyclically operable control means coupled to and driven by said motive means; detector means for providing signals responsive to the phase of said control means; and reset means coupled to said control means for decoupling said control means from said motive means, driving said control means to a predetermined phase, and recoupling said control means to said motive means.

The above and other objects and advantages of the invention are believed made clear by detailed reference hereinbelow to the accompanying drawings wherein, FIG. 1 is a perspective view of a preferred embodiment of the automatic control device of the invention;

FIG. 2 is a cross-sectional view taken along line 2—2 of FIG. 1;

FIGS. 3 and 4 are end views of the control device with portions broken away;

FIG. 5 is a fragmentary perspective view of the reset mechanism of the control device; and FIG. 6 is an exploded perspective view of a detecting means of the device.

Referring now to FIGS. 1–4, a casing is generally indicated at 10 and comprises end walls 14 and 16 spaced as shown by side walls 18, spacer members 20, and attachment screws 22 extending therebetween, to form a box-like, hollow interior portion 24 of generally light-tight construction within the said casing. A reduction gear assembly 26 of any suitable, readily available construction is positioned as shown on casing wall 14 by attachment screws 28 (FIG. 2) extending therebetween, and includes a drive shaft 30 extending therefrom, through a suitable aperture 32 provided therefor in the said wall 14, into the hollow interior portion 24 of the casing 10. An electric drive motor 34, preferably but not necessarily of the synchronous type, is positioned as shown, in any convenient manner, on the reduction gear assembly 26 and includes conductors 36 extending therefrom for connection to any suitable electric power source.

A generally cylindrical drive member 38 is fixedly secured as shown, within hollow casing interior portion 24, to drive shaft 30 by set screw 40 extending therebetween, and includes a generally cylindrical flange portion 42, and a generally cylindrical end portion 44, projecting therefrom. A substantially opaque, generally cylindrical control member 46, including an enlarged central mounting portion 48, and a centrally located mounting aperture 50 of shape and dimension complementary to end portion 44 of drive member 38, is rotatably journaled as shown on the said drive member by the cooperation between the walls of end portion 44 and aperture 50. A generally cylindrical driven member 52, including a generally cylindrical flanged portion 54, is fixedly secured to the enlarged mounting portion 48 of the control member 46 by attachment screw 56 extending therebetween, and a compressed spring washer 58 positioned as shown in the space between cylindrical flanged portions 42 and 54, respectively, to form a releasable friction clutch drive of predetermined maximum torque transmission capability between driven shaft 30 and control member 46. Thus the driven rotation of driven shaft 30, through motor 34 and reduction gear assembly 26, will result in correspondingly driven rotation of the control member 46 through the said friction clutch.

Bulb holders 62 are positioned as shown within mounting apertures formed therefor at spaced points within casing wall 14. The said bulb holders are maintained in the said mounting apertures in any convenient manner, as for example a tight friction fit, and include restricted light focusing apertures 63 formed therein. Bulbs 64 are positioned as shown within the said bulb holders and removably maintained therein by the adjacent extremities of spring contact members 66 bearing thereagainst. The said contact members are pivotally mounted on the exterior of wall 14 by support posts 67 (FIG. 1), and conductors 68 are connected to the opposite extremities of the said contact members and extend therefrom for connection to any convenient power source. Thus, energization of the bulbs 64 through the contact members 66 will result in the projection of a thin, well defined beam of light from the bulb holders 62 due to the focusing effect of the restricted apertures 63.

Detecting means holders 70, of number equal to the number of bulb holders 62, are similarly positioned within mounting apertures provided therefor in casing wall 16 and include light sensitive detecting means 71 of suitable photosensitive characteristics positioned and maintained therewithin by small set screws 72 (FIG. 6) which project through the said holders to bear thereagainst. Restricted, light admitting apertures 73 are formed in each of the detecting means holders 70 and function to admit the thin beams of light from the bulb holders 62 thereto for activation of the said detecting means. To this effect, the bulb holders and detecting means holders are positioned in substantially aligned pairs within the respective casing walls 14 and 16 in such manner that the light focusing and light admitting apertures 63 and 73, respectively, are in substantial alignment within the light-tight casing interior portion 24. Thus, the photosensitive detecting means 71 positioned within each of the said detecting means holders 70 will be exposed to, and activatable by, only the thin beams of light from the bulb 64 positioned within the aligned bulb holder 62 of the same holder pair. Conductors 74 extend as shown from each of the photosensitive detecting means, whereby the voltage outputs of the said detecting means developed by the activation thereof by the thin beams of light from bulbs 64 may be conducted to suitable control circuitry. Soft rubber stop members 75 may conveniently be inserted into the exterior open extremities of detecting means holders 70, after the insertion of the detecting means 71 therein, to exclude the entrance of any extraneous light into the said detecting means holders. Apertures 76 are formed in the stop members 75 for the passage of conductors 74 therethrough.

Replacement of a bulb 64, or light-sensitive detecting means 71, may be conveniently and expeditiously effected from without casing 10 requiring, for the former, only a pivotal movement of the adjacent contact member 66 away from the end of the bulb as indicated in FIG. 1, the removal of the bulb from the bulb holder, insertion of a new bulb, and pivotal movement of the contact member into contact with the end of the new bulb. Similarly, removal and replacement of a detecting means 71 requires only the loosening of set screw 72, removal of soft rubber stop member 75, removal of the detecting means, insertion of a new detecting means into the holder, retightening of set screw 72, and reinsertion of the stop member.

Referring now in greater detail to FIG. 3, the depicted three aligned pairs of bulb and detecting means holders will be seen to be located in casing walls 14 and 16 at different radial distances from the center of drive shaft 30. For convenience of description, the said pairs have been identified as A, B and C, respectively, in the said figure, and the dashed lines a—a, b—b, and c—c, respectively, utilized to indicate in part the circular lines traceable thereby on the surface of control member 46 by the respective centers of the said bulb and detecting means holder pairs as the former is rotated therebetween. A plurality of groups of arcuate slits, 42a, 42b, and 42c, the respective center lines of which substantially coincide with said dashed lines, are formed in the substantially opaque control member 46. The said slots of each of said groups are of predetermined extent and spacing, and at the same radial distance from the center of the said drive shaft 30, whereby each of said groups is operatively associated with a different bulb and detecting means holder pair. The slits function to control the activation and deactivation of the respective detecting means by intermittently enabling the thin beams of light from the respective bulbs to impinge thereon. Thus, for example with the bulb and detecting means pairs and the control member relatively positioned as depicted in FIG. 3, the detecting means of pairs A and B would not be activated by the light from the bulbs of the said pairs due to the interposition of the solid, substantially opaque surfaces of control member 46 therebetween; while the detecting means of pair C would be activated by the light from the bulb of the said pair impinging thereon through the slit of control member slit group 42c positioned therebetween. Rotation of the control member, as for example in the clockwise direction as seen in FIG. 3, to the position thereof depicted in FIG. 4 would result, in this order, in the deactivation of the detecting means of pair C, activation of the detecting means of pair B, reactivation of the detecting means of pair C, followed by activation of the detecting means of pair A, at which point all of the detecting means would be activated. Operation of the control device is continuous in that the same time cycle for the activation and deactivation of the respective detecting means will be followed for every complete revolution of the control member. It is of course to be understood that the depicted number of slit groups, and the location and extent of the slits formed in control member 46, are intended as exemplary only and that in practice, the control device of our invention is readily adaptable to almost infinite variation therein. Thus, for example, casing walls 14 and 16 of casing 10, and control member 46 could be substantially increased in size, whereby the inclusion of ten or more bulb and detecting means holder pairs would be made possible, and the activation of the detecting means included therein simultaneously controlled by one control member including ten or more groups of slits to in turn control ten or more operations. Alternatively, were the control of only two, rather than three, operations desired, the simple pivotal movement of one contact member 66 out of contact with bulb 64 to continuously maintain one of the detecting means deactivated is one example of the manner in which this could be effected. Further, material variation in the activation and deactivation timing sequences of some or all of the included detecting means could readily be effected by the substitution, in a mechanically obvious manner, of control members with slit groups 42a, 42b and 42c comprising slits of different number and/or extent, and/or relative location.

A reset mechanism is indicated generally at 80 and functions to return the control member 46 to an initial or starting position coinciding with the commencement of a control cycle. The reset mechanism comprises a reset cam 82, of the depicted shape, centrally attached to enlarged, central mounting portion 48 of control member 46 by attachment screws 84 extending therebetween. A cam actuator 86, including a peaked extremity 88, is slidably positioned on the interior surface of casing wall 16 by the cooperation between the surface of the said actuator, spacer elements 89, guide screws 90 and 92 and complementary shaped, enclosed slots 94 and 96 (FIG. 5) formed in the said cam actuator 86. The actuator includes a bent over handle portion 98 formed at the extremity thereof remote from the casing, and is spring biased toward the position thereof depicted in FIGS. 2–4, by the action of compression spring 100 thereagainst. The said compression spring is supported by support rod 102 which is in turn supported as shown from the exterior surface of wall 16 by mounting bracket 104. Guide screw 90 projects through spacer element 87, wall 16, and an aperture in mounting bracket 104, and a nut 106 attached to the projecting end thereof to securely affix the said screw and mounting bracket in the depicted positions thereof.

Assuming the initial or starting position of the control member be that depicted in FIG. 4, and rotational movement thereof to any other position, as for example that depicted in FIG. 3, it may thus be understood whereby the application of upward pressure to handle portion 98 of slidable cam actuator 86 will result in upward movement of the latter as indicated by the dashed lines in FIG. 2 toward reset cam 82 and eventual abutment between the peaked extremity 88 of the said actuator and the said cam, whereby the latter and the control member to which it is affixed by attachment screws 84, will, of necessity, be returned to the position thereof depicted in FIG. 4. This will not require sufficient pressure to rotate the armature of motor 34 through the reduction gear assembly 26 in that the maximum torque transmission capability of the slippable friction clutch established by flanges 42 and 54, and washer 58 compressed therebetween, will be exceeded and the clutch drive released to enable the control member to be turned without requiring a turning of the drive shaft. Thus, for example, with the control member in the position thereof depicted in FIG. 3, sufficient upward movement of the actuator 86 will conveniently effect the return of the said control member to the position thereof depicted in FIG. 4. It is to be noted that the maximum torque transmission capability of the said friction clutch may be relatively small because the use of light-sensitive, rather than mechanical control, detecting means eliminates the necessity for the mechanical contact of control switch actuator arms with the control member, and the drag forces on the said member which would be occasioned thereby. Thus, the said clutch need only have the torque transmission capability sufficient to overcome the inertia of the driven member 52, the control member 46, and the enlarged central mounting portion 48 of the latter, to effect satisfactory driven rotation of the control member from drive shaft 30.

The control device of our invention would find additional utilization in automatic analysis and recording apparatus of the general nature disclosed, for example, in U.S. Patent No. 3,196,449, issued July 20, 1965 to Milton H. Pelavin. As disclosed therein, a plurality of timing cam control members are utilized to control the opening and closing of electromechanical switches by mechanical contact therebetween to in turn control the operation of automatic sample supply, analysis, and recording apparatus. Such utilization of the control device of my invention would include the substitution thereof for all of the said plurality of timing cam control members, and the inclusion of one group of control member slits and a cooperatively associated, light sensitive detecting means for the control of each operation formerly controlled by an individual timing cam control member and cooperatively associated electromechanical switch. The reset mechanism would enable the convenient return of the control member to an initial position thereof coinciding with the commencement of the automatic sample supply, analysis, and recording operation.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. An automatic control device comprising: control means; detector means for providing signals responsive to the relationship between said control means and said detector means; motive means including slip clutch means coupled between said control means and said detector means for providing uniform relative movement therebetween; and reset means adapted to be coupled between said control means and said detector means for driving said control means and said detector means to a predetermined relationship, decoupling said motive means by causing said slip clutch means to slip, and then permitting said slip clutch to re-engage.

2. A device according to claim 1 further including support means; said detector means being fixed with respect to said support means; said control means being movable with respect to said support means.

3. A device according to claim 2 wherein said reset means includes a first portion which is fixed to and is rotatable with said control means, and a second portion which is coupled to said support means and is adapted to be engaged with said first portion and to drive said first portion to a predetermined relationship therewith.

4. A device according to claim 3 wherein said control means includes a disk mounted for rotation with respect to said support means; and said first portion of said reset means is a cam and said second portion is a cam actuator.

5. A device according to claim 4 further including a plurality of light sources fixed with respect to said support means; said detector means including a plurality of light detectors; said control means including opaque portions for precluding the passage of light from a light source to a light detector and at least one light permeable portion for permitting the passage of light from a light source to a light detector.

6. A device for cyclically providing a predetermined series of control signals comprising: cyclically operable motive means; cyclically operable control means coupled to and driven by said motive means; detector means for providing signals responsive to the phase of said control means; and reset means coupled to said control means for changing the phase relationship between said motive means and said control means.

7. A device for cyclically providing a predetermined series of control signals comprising: cyclically operable motive means; cyclically operable control means coupled to and driven by said motive means; detector means for providing signals responsive to the phase of said control means; and reset means coupled to said control means for automatically, upon actuation, decoupling said control means from said motive means, and driving said control means to a predetermined phase, and recoupling said control means to said motive means.

8. A device according to claim 7 wherein said reset means includes a friction clutch coupling said motive means to said control means and means for driving said control means and slipping said clutch against said motive means.

References Cited by the Examiner

UNITED STATES PATENTS

| | | | |
|---|---|---|---|
| 502,104 | 7/1893 | Roe | 200—46 |
| 2,055,031 | 9/1936 | Hutchings. | |
| 2,268,133 | 12/1941 | Carlson | 250—233 X |
| 2,947,186 | 8/1960 | Greenwald | 74—104 X |
| 3,070,673 | 12/1962 | Beguin | 200—46 |
| 3,109,101 | 10/1963 | Winter | 250—233 |
| 3,198,966 | 8/1965 | Roberts | 250—233 X |

RALPH G. NILSON, *Primary Examiner.*

M. A. LEAVITT, *Assistant Examiner.*